United States Patent
Jeong et al.

(10) Patent No.: US 12,421,328 B2
(45) Date of Patent: Sep. 23, 2025

(54) METHOD FOR PREPARING SUPPORTED METALLOCENE CATALYST, SUPPORTED METALLOCENE CATALYST, AND METHOD FOR PREPARING POLYOLEFIN USING THE SAME

(71) Applicant: LG CHEM, LTD., Seoul (KR)

(72) Inventors: Cheolhwan Jeong, Daejeon (KR); Seungmi Lee, Daejeon (KR); Jung Won Lee, Daejeon (KR); Hyun Jee Kwon, Daejeon (KR); Yongwoo Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 569 days.

(21) Appl. No.: 17/909,977

(22) PCT Filed: Aug. 5, 2021

(86) PCT No.: PCT/KR2021/010360
§ 371 (c)(1),
(2) Date: Sep. 7, 2022

(87) PCT Pub. No.: WO2022/035132
PCT Pub. Date: Feb. 17, 2022

(65) Prior Publication Data
US 2023/0110235 A1  Apr. 13, 2023

(30) Foreign Application Priority Data

Aug. 12, 2020 (KR) .................. 10-2020-0101353
Aug. 4, 2021 (KR) .................. 10-2021-0102776

(51) Int. Cl.
C08F 4/64 (2006.01)
C08F 4/639 (2006.01)
C08F 4/659 (2006.01)

(52) U.S. Cl.
CPC ...... *C08F 4/65916* (2013.01); *C08F 4/63912* (2013.01); *C08F 4/63916* (2013.01); *C08F 2500/24* (2013.01)

(58) Field of Classification Search
None
See application file for complete search history.

(56) References Cited

U.S. PATENT DOCUMENTS 5,985,784 A  11/1999 Winter et al.
6,605,676 B1  8/2003 Vega et al.
(Continued)

FOREIGN PATENT DOCUMENTS

CN  1307594 A  8/2001
CN  101475654 A  7/2009
(Continued)

OTHER PUBLICATIONS

International Search Report (with translation) and Written Opinion dated Nov. 26, 2021, issued in corresponding International Patent Application No. PCT/KR2021/010360.
(Continued)

*Primary Examiner* — Richard A. Huhn
(74) *Attorney, Agent, or Firm* — Morgan, Lewis & Bockius LLP (57) ABSTRACT

A supported metallocene catalyst can include a silica-based carrier and an aluminum alkyl halide, a cocatalyst compound, and a metallocene compound supported in the silica-based carrier. The aluminum alkyl halide is supported at higher rate on the surface of the silica-based carrier than inside the pores, and the cocatalyst compound is supported at higher rate inside the pores of the silica-based carrier than on the surface of the silica-based carrier. Such a supported metallocene catalyst can be prepared by: (i) supporting an aluminum alkyl halide in a silica-based carrier; (ii) support-
(Continued)

ing a cocatalyst compound in the silica-based carrier in which the aluminum alkyl halide is supported; and (iii) supporting a metallocene compound in the carrier in which the aluminum alkyl halide and the cocatalyst compound are supported. Such a supported metallocene catalyst can be used to polymerize polyolefins with excellent activity and polyolefin with a uniform powder morphology.

15 Claims, 1 Drawing Sheet

(56) References Cited

U.S. PATENT DOCUMENTS

| | | | |
|---|---|---|---|
| 6,720,394 | B1 | 4/2004 | Kallio et al. |
| 2002/0137624 | A1 | 9/2002 | Gauthier et al. |
| 2006/0229420 | A1 | 10/2006 | Jensen et al. |
| 2010/0029877 | A1 | 2/2010 | Funaya et al. |
| 2013/0211021 | A1 | 8/2013 | Lee et al. |
| 2014/0378620 | A1 | 12/2014 | Iwase et al. |
| 2015/0011719 | A1 | 1/2015 | Mariott et al. |
| 2016/0152742 | A1 * | 6/2016 | Lee ................ C08F 110/02 502/104 |
| 2016/0304637 | A1 | 10/2016 | Lee et al. |
| 2017/0037165 | A1 | 2/2017 | Ajellal et al. |
| 2019/0085100 | A1 | 3/2019 | Song et al. |
| 2021/0031180 | A1 | 2/2021 | Kim et al. |
| 2021/0238317 | A1 | 8/2021 | Lee et al. |

FOREIGN PATENT DOCUMENTS

| | | | |
|---|---|---|---|
| CN | 105980417 | A | 9/2016 |
| JP | S63-89505 | A | 4/1988 |
| JP | H08-053509 | A | 2/1996 |
| JP | 2000-038418 | A | 2/2000 |
| JP | 3292649 | B2 | 6/2002 |
| JP | 2004-002640 | A | 1/2004 |
| JP | 2013-100481 | A | 5/2013 |
| JP | 2014-159591 | A | 9/2014 |
| JP | 5892025 | B2 | 3/2016 |
| JP | 2016135879 | A * | 7/2016 |
| JP | 2018-529826 | A | 10/2018 |
| JP | 2021-525307 | A | 9/2021 |
| KR | 10-0268539 | B1 | 10/2000 |
| KR | 2004-0061917 | A | 7/2004 |
| KR | 2006-0068250 | A | 6/2006 |
| KR | 2011-0077883 | A | 7/2011 |
| KR | 2011-0114476 | A | 10/2011 |
| KR | 2012-0076160 | A | 7/2012 |
| KR | 10-2013-0027316 | A | 3/2013 |
| KR | 2014-0138823 | A | 12/2014 |
| KR | 10-2015-0062145 | A | 6/2015 |
| KR | 10-1692641 | B1 | 1/2017 |
| KR | 10-2018-0066303 | A | 6/2018 |
| KR | 10-2019-0058032 | A | 5/2019 |
| KR | 10-2019-0060317 | A | 6/2019 |
| KR | 10-2019-0074799 | A | 6/2019 |
| KR | 2019-0078500 | A | 7/2019 |
| KR | 2020-0036691 | A | 4/2020 |
| KR | 2020-0058047 | A | 5/2020 |
| KR | 2020-0101874 | A | 8/2020 |
| RU | 2382793 | C2 | 2/2010 |
| RU | 2621683 | C2 | 6/2017 |
| RU | 2693453 | C2 | 7/2019 |
| WO | 2018/106010 | A1 | 6/2018 |

OTHER PUBLICATIONS

Office Action dated Jul. 11, 2024, of the corresponding Russian Patent Application No. 2022124833.

Office action issued Sep. 21, 2023, by the Chinese Patent Office corresponding to Chinese Patent Application No. 202180020256.7.

* cited by examiner

METHOD FOR PREPARING SUPPORTED METALLOCENE CATALYST, SUPPORTED METALLOCENE CATALYST, AND METHOD FOR PREPARING POLYOLEFIN USING THE SAME

CROSS CITATION WITH RELATED APPLICATION(S)

This application claims the benefit of Korean Patent Application No. 10-2020-0101353 filed on Aug. 12, 2020 and Korean Patent Application No. 10-2021-0102776 filed on Aug. 4, 2021 with the Korean Intellectual Property Office, the disclosures of which are herein incorporated by reference in their entirety.

TECHNICAL FIELD

This invention relates to a method for preparing a supported metallocene catalyst, a supported metallocene catalyst and a method for preparing polyolefin using the same.

BACKGROUND

Olefin polymerization catalyst systems may be classified into Ziegler Natta and metallocene catalyst systems.

Among them, a metallocene catalyst consists of a main catalyst including a transition metal compound as a main component and a cocatalyst which is an organic metal compound including aluminum as a main component.

The metallocene catalyst is a homogeneous complex catalyst and a single site catalyst. According to the properties of the single site catalyst, polymer having narrow molecular weight distribution and uniform comonomer composition distribution is obtained, and the tacticity of polymer, copolymerization property, molecular weight, degree of crystallinity, and the like may be changed by deformation of the ligand structure of the catalyst and alteration of polymerization conditions.

In general, an olefin polymerization process is classified into a high pressure process, a solution process, a slurry process, a gas phase process, and the like, and efforts are being made to prepare polyolefin having desired properties by applying various metallocene-based catalysts in the polymerization process.

A metallocene catalyst used in the preparation method of polyolefin using a slurry or gas-phase polymerization process should be firmly fixed to an appropriate carrier and should not generate fouling of a reactor due to leaching.

Particularly, when progressing olefin polymerization using a supported catalyst, it is important to control the morphology of polyolefin powder for stable process progression. Non-uniform particle shape of polyolefin obtained may increase generation of fines due to collision between particles in the reactor. In the slurry process, it may be difficult to discharge the fines, thus lowering process productivity. In the gas-phase process, the fines may cause sheeting on the reactor wall surface or utility malfunction, thus disrupting stable process progression.

DETAILED DESCRIPTION OF THE INVENTION

Technical Problem

It is an object of the invention to provide a method for preparing a supported metallocene catalyst that not only has excellent olefin polymerization activity, but also enables preparation of polyolefin having a uniform powder morphology.

It is another object of the invention to provide a supported metallocene catalyst that not only has excellent olefin polymerization activity, but also enables preparation of polyolefin having a uniform powder morphology.

It is yet another object of the invention to provide a method for preparing polyolefin using the supported metallocene catalyst.

Technical Solution

According to one embodiment of the invention, there is provided a method for preparing a supported metallocene catalyst, comprising steps of:
(i) supporting aluminum alkyl halide of the following Chemical Formula 1 in a silica-based carrier;
(ii) supporting a cocatalyst compound in the silica-based carrier in which the aluminum alkyl halide is supported; and
(iii) supporting a metallocene compound in the carrier in which the aluminum alkyl halide and the cocatalyst compound are supported.

[Chemical Formula 1]

in the Chemical Formula 1,
$R^{11}$, $R^{12}$, and $R^{13}$ are each independently $C_{1-5}$ alkyl or halogen, and one or two of the $R^{11}$ to $R^{13}$ are halogen.

According to another embodiment of the invention, there is provided a supported metallocene catalyst comprising
a silica-based carrier; and
aluminum alkyl halide of the Chemical Formula 1, a cocatalyst compound, and a metallocene compound supported in the silica-based carrier,
wherein the aluminum alkyl halide is supported at higher rate on the surface of the silica-based carrier than insides the pores of the silica-based carrier, and
the cocatalyst compound is supported at higher rate insides the pores of eth silica-based carrier than on the surface of the silica-based carrier:

According to yet another embodiment of the invention, there is provided a method for preparing polyolefin comprising a step of polymerizing olefin monomers in the presence of the supported metallocene catalyst to obtain polyolefin,
wherein the polyolefin comprises polyolefin fine with a particle size less than 125 μm and polyolefin chunk with a particle size greater than 2.0 mm, respectively in the content of 2 wt % or less.

Hereinafter, a method for preparing a supported metallocene catalyst, a supported metallocene catalyst and a method for preparing polyolefin according to the embodiments of the invention will be explained.

Unless otherwise defined, all the technical terms and scientific terms used herein have the same meanings generally understood by a person having ordinary knowledge in the art. The terms used herein are only to effectively explain specific embodiments and are not intended to limit the invention.

A singular expression includes a plural expression thereof, unless it is expressly stated or obvious from the context that such is not intended.

As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the present invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

And, in case location relation of two parts are explained by 'on', 'above', 'below', 'under', 'beside', and the like, other parts may be located between the two parts unless the expression 'right' or 'directly' is used.

And, in case time sequence is explained by 'after', 'subsequently', 'next', 'before', and the like, discontinuous cases may be included unless the expression 'right' or 'directly' is used.

And, the term 'at least one' should be understood to include all the combinations that can be presented from one or more related items.

I. Method for Preparing Supported metallocene Catalyst

According to one embodiment of the invention, there is provided a method for preparing a supported metallocene catalyst, comprising steps of:
(i) supporting aluminum alkyl halide of the following Chemical Formula 1 in a silica-based carrier;
(ii) supporting a cocatalyst compound in the silica-based carrier in which the aluminum alkyl halide is supported; and
(iii) supporting a metallocene compound in the carrier in which the aluminum alkyl halide and the cocatalyst compound are supported.

[Chemical Formula 1]

in the Chemical Formula 1,
$R^{11}$, $R^{12}$, and $R^{13}$ are each independently $C_{1-5}$ alkyl or halogen, and one or two of the $R^{11}$ to $R^{13}$ are halogen.

As the results of continuous studies of the inventors, it was confirmed that a supported metallocene catalyst prepared by the above step sequence not only has excellent olefin polymerization activity, but also enables preparation of polyolefin having a uniform powder morphology.

In general, functional groups that can react when a cocatalyst compound is reacted with a silica-based carrier are distributed inner and outer surfaces of the pores of the silica-based carrier. And, on the outer surface of the pores of the silica-based carrier that is easily accessible by reactant, a larger quantity of a cocatalyst compound reacts.

However, when progressing olefin polymerization, reactions should occur more actively inside a catalyst where spread of olefin monomers is limited than outside a catalyst so that fragmentation may be enabled, and polyolefin having a uniform powder morphology may be obtained.

A method for preparing a supported metallocene catalyst according to the above embodiment comprises first supporting aluminum alkyl halide of the Chemical Formula 1 in a silica-based carrier, and then, sequentially supporting a cocatalyst compound and a metallocene compound.

By supporting in the above sequence, a cocatalyst compound that has more influences on catalytic activity increase may be supported inside the pores of the silica-based carrier at relatively higher rate. The supported metallocene catalyst prepared by such a method can achieve uniform fragmentation, and provide polyolefin having a uniform powder morphology with high polymerization activity.

First, a step of supporting aluminum alkyl halide of the Chemical Formula in the (i) silica-based carrier is conducted.

The step (i) may comprise mixing the silica-based carrier and the aluminum alkyl halide, and then, reacting while stirring.

The silica-based carrier has high content of hydroxy groups existing on the surface, and thus, has excellent catalytic activity improvement effect. And, the silica-based carrier comprises pores on the surface and inside, and thus, has wide specific surface area.

Preferably, the silica-based carrier may be one or more compounds selected from the group consisting of silica, silica-alumina, silica-titania, and silica-zirconia.

Optionally, in order to increase support efficiency and minimize leaching and fouling, before supporting the aluminum alkyl halide, the silica-based carrier may be calcined or dried and surface-modified.

According to one embodiment, the silica-based carrier may have a moisture content of 0.1 to 7 wt %. Wherein, the moisture content is a percentage of the weight of moisture included in the carrier to the total weight of the carrier. As the silica-based carrier has a moisture content of the above range, it may comprise 0.1 to 10 mmol/g, or 0.5 to 5 mmol/g, or 0.7 to 2 mmol/g of hydroxyl groups.

Supporting of the aluminum alkyl halide of the Chemical Formula 1 may be conducted by introducing the aluminum alkyl halide in a solution in which the silica-based carrier is dispersed, and reacting while stirring.

Wherein, in order to bring the aluminum alkyl halide into contact with the silica-based carrier more smoothly, it is preferable that the aluminum alkyl halide is dissolved in a solvent and introduced as a solution phase.

As the solvent, aliphatic hydrocarbon solvents such as pentane, hexane, heptane, nonane, decane, and isomers thereof; aromatic hydrocarbon solvents such as toluene, benzene; chlorine-substituted hydrocarbon solvents such as dichloromethane, chlorobenzene; ether-based solvents such as diethylether, tetrahydrofurane (THF); ketone solvents such as acetone; ester-based solvents such as ethylacetate, and the like may be used. Among them, hexane, heptane, toluene or dichloromethane may be preferably used, and toluene having excellent dispersion effect compared to catalysts having low solubility may be more preferably used.

The aluminum alkyl halide reacts with the silica-based carrier earlier than the cocatalyst compound, and thus, may be supported at relatively higher rate on the surface of the silica-based carrier than inside the pores of the silica-based carrier. Namely, the aluminum alkyl halide allows the cocatalyst compound having a larger influence on catalytic activity increase to be supported at a relatively higher rate inside the pores of the silica-based carrier. Accordingly, when progressing olefin polymerization, reactions may actively occur inside a catalyst where spread of olefin monomers is limited, thus achieving uniform fragmentation.

Preferably, the aluminum alkyl halide may be one or more compounds selected from the group consisting of dimethylaluminum chloride, diethylaluminum chloride, diisobutylaluminum chloride, methylaluminum dichloride, ethylaluminum dichloride, and isobutylaluminum dichloride.

The step (i) may be conducted by introducing the aluminum alkyl halide in an amount of 0.1 mmol to 20 mmol per unit weight (g) of the silica-based carrier and stirring.

Preferably, in the step (i), the aluminum alkyl halide may be introduced in an amount of 0.1 mmol or more, or 1.0 mmol or more, or 3.0 mmol or more; and 20.0 mmol or less, or 15.0 mmol or less, or 10.0 mmol or less, per unit weight (g) of the silica-based carrier Specifically, in the step (i), the aluminum alkyl halide may be introduced in an amount of 0.1 mmol to 20.0 mmol, or 1.0 mmol to 20.0 mmol, or 1.0 mmol to 15.0 mmol, or 3.0 mmol to 15.0 mmol, or 3.0 mmol to 10.0 mmol per unit weight (g) of the silica-based carrier.

By introducing aluminum alkyl halide in the above content range, a uniform morphology of polyolefin powder may be achieved and generation of fine may be reduced.

The step (i) may be conducted at a temperature less than the boiling point of the solvent used. Preferably, the step (i) may be conducted at 100° C. or less, or 30 to 90° C.

Subsequently, a step (ii) of supporting a cocatalyst compound in the silica-based carrier in which the aluminum alkyl halide is supported, is conducted.

The step (ii) may comprise mixing the silica-based carrier in which the aluminum alkyl halide is supported with the cocatalyst compound, and then, reacting while stirring.

Wherein, in order to bring the cocatalyst compound into contact the silica-based carrier more smoothly, it is preferable that the cocatalyst compound is dissolved in a solvent and introduced as a solution phase.

As the solvent, those explained in the step (i) may be used.

The cocatalyst compound assists the activity of the metallocene compound, and compounds known as cocatalyst in the field to which the invention pertains may be used without specific limitations.

Preferably, the cocatalyst compound may be a compound of the following Chemical Formula 2:

[Chemical Formula 2]

in the Chemical Formula 2,
$R^{21}$, $R^{22}$, and $R^{23}$ are each independently hydrogen, halogen, a $C_{1-20}$ hydrocarbyl group or a $C_{1-20}$ hydrocarbyl group substituted with halogen.

The hydrocarbyl group is a monovalent functional group formed by removing hydrogen atom from hydrocarbon, and it may include an alkyl group, an alkenyl group, an alkynyl group, an aryl group, an aralkyl group, an aralkenyl group, an aralkynyl group, an alkylaryl group, an alkenylaryl group and an alkynylaryl group, and the like.

The $C_{1-20}$ hydrocarbyl group may be a hydrocarbyl group having a carbo number of 1 to 15 or 1 to 10. Specifically, the $C_{1-20}$ hydrocarbyl group may be a liner, branched or cyclic alkyl group such as methyl, ethyl, n-propyl, iso-propyl, n-butyl, iso-butyl, tert-butyl, n-pentyl group, n-hexyl group, cyclohexyl group, and the like; or an aryl group such as phenyl, naphthyl, or anthracenyl, and the like.

The compound of the Chemical Formula 2 may act as a scavenger of hydroxyl groups existing on the silica-based carrier, thus improving catalytic activity. The compound of the Chemical Formula 2 may convert the halogen group of a catalyst precursor into a methyl group, thus promoting chain growth during polymerization of polyolefin. And, the compound of the Chemical Formula 2 may exhibit more excellent catalytic activity improvement effect when applied in combination with a metallocene compound described below.

According to one embodiment, the cocatalyst compound may be one or more compounds selected from the group consisting of methylaluminoxane, ethylaluminoxane, n-butylaluminoxane, and isobutylaluminoxane.

Preferably, in the step (ii), the cocatalyst compound may be introduced in an amount of 5.0 mmol or more, or 8.0 mmol or more, or 10.0 mmol or more; and 25.0 mmol or less, or 20.0 mmol or less, per unit weight (g) of the silica-based carrier.

Specifically, in the step (ii), the cocatalyst compound may be introduced in an amount of 5.0 mmol to 25.0 mmol, or 8.0 mmol to 25.0 mmol, or 8.0 mmol to 20.0 mmol, or 10.0 mmol to 20.0 mmol per unit weight (g) of the silica-based carrier.

Subsequently, a step of (iii) supporting a metallocene compound in the carrier in which the aluminum alkyl halide and the cocatalyst compound are supported, is conducted.

The metallocene compound is a main catalyst component enabling exhibition of catalytic activity together with the cocatalyst compound, and those used for the preparation of polyolefin in the field to which the invention pertains may be used without specific limitations.

According to one embodiment of the invention, the metallocene compound may be one or more compounds selected from the group consisting of a compound of the following Chemical Formula 3 and a compound of the following Chemical Formula 4:

[Chemical Formula 3]

[Chemical Formula 4]

in the Chemical Formulas 3 and 4,
$R^{31}$, $R^{32}$, $R^{41}$, and $R^{42}$ are each independently hydrogen, halogen, $C_{1-20}$ alkyl, $C_{2-20}$ alkenyl, $C_{1-20}$ alkoxy, or $C_{2-20}$ alkoxyalkyl, and
$X^{31}$, $X^{32}$, $X^{41}$, and $X^{42}$ are each independently halogen or $C_{1-20}$ alkyl.

The halogen may be fluorine (F), chlorine (Cl), bromine (Br), or iodine (I).

The $C_{1-20}$ alkyl may be linear, branched or cyclic alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, n-propyl, iso-propyl, n-butyl, iso-butyl, tert-butyl, n-pentyl, iso-pentyl or cyclohexyl, and the like.

The $C_{2-20}$ alkenyl may be linear, branched or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, the $C_{2-20}$ alkenyl may be ethenyl, propenyl, butenyl, pentenyl or cyclohexenyl, and the like.

The $C_{1-20}$ alkoxy may be linear, branched or cyclic alkoxy. Specifically, the $C_{1-20}$ alkoxy may be methoxy, ethoxy, n-butoxy, tert-butoxy, phenyloxy, cyclohexyloxy, and the like.

The $C_{2-20}$ alkoxyalkyl means a substituent in which one or more hydrogen atoms of an alkyl group are substituted with alkoxy. Specifically, the $C_{2-20}$ alkoxyalkyl may be methoxymethyl, ethoxymethyl, methoxyethyl, ethoxyethyl, butoxymethyl, butoxyethyl, butoxypropyl, butoxybutyl, butoxyheptyl, butoxyhexyl, and the like.

According to one embodiment of the invention, in the Chemical Formula 3, $R^{31}$ and $R^{32}$ may be each independently $C_{4-20}$ alkyl, or $C_{5-9}$ linear alkyl substituted with tert-butoxy. Preferably, the $R^{31}$ and $R^{32}$ may be each independently n-butyl, or n-hexyl substituted with tert-butoxy.

In the Chemical Formula 3, $X^{31}$ and $X^{32}$ may be each independently chlorine or methyl.

As non-limiting examples, the compound of the Chemical Formula 3 may be a compound represented by the following Chemical Formula 3a or Chemical Formula 3b.

[Chemical Formula 3a]

[Chemical Formula 3b]

According to one embodiment of the invention, in the Chemical Formula 4, $R^{41}$ and $R^{42}$ may be respectively $C_{1-3}$ alkyl. Preferably, the $R^{41}$ and $R^{42}$ may be respectively propyl.

In the Chemical Formula 4, $X^{41}$ and $X^{42}$ may be each independently chlorine or methyl.

As non-limiting examples, the compound of the Chemical Formula 4 may be a compound represented by the following Chemical Formula 4a or Chemical Formula 4b.

[Chemical Formula 4a]

[Chemical Formula 4b]

The compounds of the Chemical Formula 3 and 4 may be synthesized applying known reactions, and for more detailed synthesis method, synthesis examples described below may be referred to.

Preferably, in the step (iii), the metallocene compound may be introduced in an amount of 0.01 mmol to 1.0 mmol, or 0.01 mmol to 0.8 mmol per unit weight (g) of the silica-based carrier.

In order to exhibit sufficient catalytic activity, it is preferable that the metallocene compound is introduced in an amount of 0.01 mmol or more per unit weight (g) of the silica-based carrier. However, if the metallocene compound is introduced in an excessive amount, there is a concern about generation of fouling due to excessive catalytic activity. Thus, it is preferable that the metallocene compound is introduced in an amount of 1.0 mmol or less per unit weight (g) of the silica-based carrier.

The step (iii) may be conducted at a temperature of 20° C. to 120° C.

In the step (iii), solvents described in the step (i) may be used.

According to one embodiment of the invention, the metallocene compound may comprise a first metallocene compound of the Chemical Formula 3 and a second metallocene compound of the Chemical Formula 4.

The first metallocene compound of the Chemical Formula 3 may contribute to formation of low molecular weight linear copolymer. The second metallocene compound of the Chemical Formula 4 may contribute to formation of high molecular weight linear copolymer.

By using the first and second metallocene compounds as the metallocene compound, excellent support performance, catalytic activity, and high copolymerizability may be exhibited.

In this case, in terms of support efficiency and catalytic activity improvement according to control of support sequence, the first metallocene compound and the second metallocene compound may be sequentially supported in the silica-based carrier in which the aluminum alkyl halide and the cocatalyst compound are supported.

Preferably, the metallocene compound may comprise the first metallocene compound and the second metallocene compound at a mole ratio of 1:0.3 to 1:3.5.

In order to exhibit excellent copolymerizability, it is preferable that the metallocene compound comprises the first metallocene compound and the second metallocene compound at a mole ratio of 1:0.3 or more. However, if the mole ratio is too large, it may be difficult to reproduce desired molecular structure of polyolefin. Thus, it is preferable that the metallocene compound comprises the first metallocene compound and the second metallocene compound at a mole ratio of 1:3.5 or less.

The first and second metallocene compounds may be respectively supported at a temperature of 40 to 90° C., or 50 to 80° C. It may be more preferable in terms of support efficiency that a temperature at which the second metallocene compound is supported is higher than a temperature at which the first metallocene compound is supported.

II. Supported metallocene Catalyst

According to another embodiment of the invention, there is provided a supported metallocene catalyst comprising
a silica-based carrier; and
aluminum alkyl halide of the following Chemical Formula 1, a cocatalyst compound, and a metallocene compound supported in the silica-based carrier,
wherein the aluminum alkyl halide is supported at higher rate on the surface of the silica-based carrier than inside the pores of the silica-based carrier, and
the cocatalyst compound is supported at higher rate inside the pores of the silica-based carrier than on the surface of the silica-based carrier:

[Chemical Formula 1]

in the Chemical Formula 1,
$R^{11}$, $R^{12}$, and $R^{13}$ are each independently $C_{1-5}$ alkyl or halogen, and one or two of the $R^{11}$ to $R^{13}$ is halogen.

The supported metallocene catalyst may be prepared according to the I. method for preparing supported metallocene catalyst explained above.

Namely, the supported metallocene catalyst is obtained by first supporting aluminum alkyl halide of the Chemical Formula 1 in a silica-based carrier, and then, sequentially supporting a cocatalyst compound and a metallocene compound.

By supporting in the above sequence, a cocatalyst compound that has more influence on catalyst activity increase may be supported inside the pores of the silica-based carrier at relatively higher rate. The supported metallocene catalyst prepared by such a method can achieve uniform fragmentation, and provide polyolefin having a uniform powder morphology with high polymerization activity.

By supporting in the above sequence, in the supported metallocene catalyst, the aluminum alkyl halide is supported at relatively higher rate on the surface of the silica-based carried than inside the pores of the silica-based carrier. And, in the supported metallocene catalyst, the cocatalyst compound is supported at relatively higher rate inside the pores of the silica-based carrier than on the surface of the silica-based carrier.

In the supported metallocene catalyst, the metallocene compound is mainly supported inside the silica-based carrier, specifically inside the pores of the silica-based carrier, due to interaction of the aluminum alkyl halide with the cocatalyst compound.

In the supported metallocene catalyst, to the aluminum alkyl halide, the cocatalyst compound, and the metallocene compound, previous explanations in the I. method for preparing supported metallocene catalyst are applied.

According to one embodiment of the invention, the aluminum alkyl halide may be one or more compounds selected from the group consisting of dimethylaluminum chloride, diethylaluminum chloride, diisobutylaluminum chloride, methylaluminum dichloride, ethylaluminum dichloride, and isobutylaluminum dichloride.

According to one embodiment of the invention, the cocatalyst compound may be a compound of the Chemical Formula 2. As non-limiting examples, the cocatalyst compound may be one or more compounds selected from the group consisting of methylaluminoxane, ethylaluminoxane, n-butylaluminoxane, and isobutylaluminoxane.

According to one embodiment of the invention, the metallocene compound may be one or more compounds selected from the group consisting of a compound of the Chemical Formula 3 and a compound of the Chemical Formula 4.

Preferably, the metallocene compound may comprise a first metallocene compound of the Chemical Formula 3 and a second metallocene compound of the Chemical Formula 4. Preferably, the metallocene compound may comprise the first metallocene compound of the Chemical Formula 3 and the second metallocene compound of the Chemical Formula 4 at a mole ratio of 1:0.3 to 1:3.5.

Since the supported metallocene catalyst has the above support construction, it not only has excellent olefin polymerization activity, but also enables preparation of polyolefin having a uniform powder morphology.

III. Method for Preparing polyolefin

According to yet another embodiment of the invention, there is provided a method for preparing polyolefin comprising a step of polymerizing olefin monomers in the presence of the above explained supported metallocene catalyst to obtain polyolefin,
wherein the polyolefin comprises polyolefin fine with a particle size less than 125 μm and polyolefin chunk with a particle size greater than 2.0 mm, respectively in the content of 2 wt % or less.

The supported metallocene catalyst is the II. supported metallocene catalyst as explained above, and may be prepared by the I. method for preparing supported metallocene catalyst as explained above.

The method for preparing polyolefin may be conducted applying common apparatus and contact technology, using olefin monomers as raw materials, in the presence of the above explained supported metallocene catalyst.

The supported metallocene catalyst may be used as it is. Alternatively, the supported metallocene catalyst may be subjected to a contact reaction with olefin monomers to prepare a prepolymerized catalyst, and used.

The supported metallocene catalyst may be used in the state of slurry or while diluted in a solvent according to polymerization method. Alternatively, the supported metallocene catalyst may be used in the form of a mud catalyst mixed with a mixture of oil and grease.

The polymerization reaction may be conducted using one continuous slurry polymerization reactor, loop slurry reactor, gas phase reactor, or solution reactor.

The polymerization reaction may be conducted as homopolymerization using one kind of olefin monomers, or copolymerization using two or more kinds of olefin monomers.

The olefin monomers may be ethylene, alpha-olefin, cyclic olefin, diene olefin having two or more double bonds, or triene olefin.

Specifically, as the olefin monomers, ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidene norbornene, phenyl norbornene, vinyl norbornene, dicylcopentadiene, 1,4-butadiene, 1,5-pentadiene, 1,6-hexadiene, styrene, alpha-methyl styrene, divinyl benzene, 3-chloromethyl styrene, and the like may be mentioned.

According to one embodiment of the invention, the polyolefin may be polyethylene, which is ethylene homopolymer. And, the polyolefin may be a copolymer of ethylene and comonomers. As the comonomers, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, and the like may be used.

The polymerization of olefin monomers may be conducted at a temperature of 25 to 500° C. and a reaction pressure of 1 to 100 kgf/cm² for 1 to 24 hours. Specifically, the polymerization of olefin monomers may be conducted at a temperature of 25 to 500° C., or 25 to 200° C., or 50 to about 100° C. And, the polymerization of olefin monomers may be conducted at a reaction pressure of 1 to 100 kgf/cm², or 1 to 60 kgf/cm², or 5 to 45 kgf/cm².

Polyolefin obtained by the above preparation method may have a uniform powder morphology.

According to one embodiment of the invention, polyolefin obtained by the above preparation method may comprise polyolefin fine having a particle size less than 125 μm and polyolefin chunk having a particle size greater than 2.0 mm, respectively in the content of 2 wt % or less. The contents of polyolefin fine and chunk may be calculated by particle size distribution analysis.

Preferably, the polyolefin may comprise polyolefin fine having a particle size less than 125 μm in the content of 2.0 wt % or less, or 0.1 to 2.0 wt %, or 0.5 to 2.0 wt %, or 0.5 to 1.5 wt %, or 0.6 to 1.3 wt %, based on the total weight of polyolefin.

And, the polyolefin may comprise polyolefin chunk having a particle size greater than 2.0 mm in the content of 2.0 wt % or less, or 0.5 to 2.0 wt %, or 1.0 to 2.0 wt %, or 1.0 to 1.8 wt %, or 1.2 to 1.7 wt %, based on the total weight of polyolefin.

Advantageous Effects

According to this invention, there are provided a method for preparing a supported metallocene catalyst that not only has excellent olefin polymerization activity, but also enables preparation of polyolefin having a uniform powder morphology, a supported metallocene catalyst prepared by the above method, and a method for preparing polyolefin using the supported metallocene catalyst.

DETAILED DESCRIPTION OF THE EMBODIMENTS

Hereinafter, preferable examples are presented for better understanding of the invention. However, these examples are presented only as the illustrations of the invention, and the scope of the invention is not limited thereby.

[Preparation of Supported Metallocene Catalyst]

Example 1

Silica (Grace Davison, SP952) was dehydrated and dried at 200° C. under vacuum for 12 hours.

Into a 2 L SUS high pressure reactor, 50 ml of toluene and 10 g of the silica were introduced, and then, stirred while raising the temperature of the reactor to 40° C. A solution of dimethylaluminum chloride (5 mmol/g-SiO$_2$)/toluene was introduced thereto, and stirred for 12 hours, and then, decanted.

Subsequently, 53.1 ml of solution of 10 wt % methylaluminoxane (MAO)/toluene (10 mmol/g-SiO$_2$) was introduced, and stirred for 12 hours.

The temperature of the reactor was raised to 60° C., a solution of the first metallocene compound of the following Chemical Formula 3b (0.01 mmol/g-SiO$_2$)/toluene was introduced and stirred for 2 hours. Subsequently, a solution of the second metallocene compound of the following Chemical Formula 4a (0.01 mmol/g-SiO$_2$)/toluene was introduced, and stirred for 2 hours, and then, decanted.

1 kg of hexane was introduced the reactor and transferred to a filter dry, and the hexane solution was filtered. It was dried at 50° C. for 4 hours to obtain a supported metallocene catalyst.

[Chemical Formula 3b]

[Chemical Formula 4a]

Example 2

A supported metallocene catalyst was obtained by the same method as Example 1, except that a diethylaluminum chloride ((5 mmol/g-SiO$_2$)/toluene solution was used instead of the dimethylaluminum chloride/toluene solution.

Example 3

A supported metallocene catalyst was obtained by the same method as Example 1, except that a diisobutylaluminum chloride ((5 mmol/g-SiO$_2$)/toluene solution was used instead of the dimethylaluminum chloride/toluene solution.

Example 4

A supported metallocene catalyst was obtained by the same method as Example 1, except that a methylaluminum dichloride ((5 mmol/g-SiO$_2$)/toluene solution was used instead of the dimethylaluminum chloride/toluene solution.

Example 5

A supported metallocene catalyst was obtained by the same method as Example 1, except that an ethylaluminum dichloride ((5 mmol/g-SiO$_2$)/toluene solution was used instead of the dimethylaluminum chloride/toluene solution.

Example 6

A supported metallocene catalyst was obtained by the same method as Example 1, except that an isobutylaluminum dichloride ((5 mmol/g-SiO$_2$)/toluene solution was used instead of the dimethylaluminum chloride/toluene solution.

Comparative Example 1

A supported metallocene catalyst was obtained by the same method as Example 1, except that the dimethylaluminum chloride/toluene solution was not used.

Specifically, into a 2 L SUS high pressure reactor, 50 ml of toluene and 10 g of the silica were introduced, and then, stirred while raising the temperature of the reactor to 40° C. Subsequently, 53.1 ml of solution of 10 wt % methylaluminoxane (MAO)/toluene (10 mmol/g-SiO$_2$) was introduced, and stirred for 12 hours. The temperature of the reactor was raised to 60° C., a solution of the first metallocene compound of the Chemical Formula 3b (0.01 mmol/g-SiO$_2$)/toluene was introduced and stirred for 2 hours. Subsequently, a solution of the second metallocene compound of the Chemical Formula 4a (0.01 mmol/g-SiO$_2$)/toluene was introduced, and stirred for 2 hours, and then, decanted. 1 kg of hexane was introduced in the reactor and transferred to a filter dry, and the hexane solution was filtered. It was dried at 50° C. for 4 hours to obtain a supported metallocene catalyst.

Comparative Example 2

The supported metallocene catalyst was obtained by the same method as Example 1, except that the introduction sequence of the dimethylaluminum chloride/toluene solution and the methylaluminoxane (MAO)/toluene solution was inversed.

Specifically, into a 2 L SUS high pressure reactor, 50 ml of toluene and 10 g of the silica were introduced, and then, stirred while raising the temperature of the reactor to 40° C. 53.1 ml of a solution of 10 wt % methylaluminoxane (MAO)/toluene (10 mmol/g-SiO$_2$) was introduced thereto, and stirred for 12 hours, and then, decanted. Subsequently, a solution of dimethylaluminum chloride (5 mmol/g-SiO$_2$)/toluene was introduced and stirred for 12 hours. The temperature of the reactor was raised to 60° C., a solution of the first metallocene compound of the Chemical Formula 3b (0.01 mmol/g-SiO$_2$)/toluene was introduced and stirred for 2 hours. Subsequently, a solution of the second metallocene compound of the Chemical Formula 4a (0.01 mmol/g-SiO$_2$)/toluene was introduced, and stirred for 2 hours, and then, decanted. 1 kg of hexane was introduced in the reactor and transferred to a filter dry, and the hexane solution was filtered. It was dried at 50° C. for 4 hours to obtain a supported metallocene catalyst.

Comparative Example A

A supported metallocene catalyst was obtained by the same method as Example 1, except that a trimethylaluminum (5 mmol/g-SiO$_2$)/toluene solution was used instead of the dimethylaluminum chloride/toluene solution.

Comparative Example B

A supported metallocene catalyst was obtained by the same method as Example 1, except that a triethylaluminum (5 mmol/g-SiO$_2$)/toluene solution was used instead of the dimethylaluminum chloride/toluene solution.

Comparative Example C

A supported metallocene catalyst was obtained by the same method as Example 1, except that a triisobutylaluminum (5 mmol/g-SiO$_2$)/toluene solution was used instead of the dimethylaluminum chloride/toluene solution.

Preparation of polyolefin

Example 7

In the presence of the supported metallocene catalyst obtained in Example 1, ethylene was polymerized to prepare polyethylene.

Specifically, 600 ml of an autoclave was vacuum dried, and then, 400 ml of hexane and 10 mg of the supported metallocene catalyst of Example 1 were introduced therein. After raising the temperature of the reactor to 80° C., while introducing ethylene so as to maintain a pressure of 14 kgf/cm$^2$, the reaction solution was stirred and subjected to a polymerization reaction for 1 hour. After the reaction was completed, it was filtered and dried to obtain polyethylene powder.

Example 8

Polyethylene powder was obtained by the same method as Example 7, except that the supported metallocene catalyst obtained in Example 2 was used instead of the supported metallocene catalyst of Example 1.

Example 9

Polyethylene powder was obtained by the same method as Example 7, except that the supported metallocene catalyst obtained in Example 3 was used instead of the supported metallocene catalyst of Example 1.

Example 10

Polyethylene powder was obtained by the same method as Example 7, except that the supported metallocene catalyst obtained in Example 4 was used instead of the supported metallocene catalyst of Example 1.

Example 11

Polyethylene powder was obtained by the same method as Example 7, except that the supported metallocene catalyst obtained in Example 5 was used instead of the supported metallocene catalyst of Example 1.

Example 12

Polyethylene powder was obtained by the same method as Example 7, except that the supported metallocene catalyst obtained in Example 6 was used instead of the supported metallocene catalyst of Example 1.

Comparative Example 3

Polyethylene powder was obtained by the same method as Example 7, except that the supported metallocene catalyst obtained in Comparative Example 1 was used instead of the supported metallocene catalyst of Example 1.

Comparative Example 4

Polyethylene powder was obtained by the same method as Example 7, except that the supported metallocene catalyst obtained in Comparative Example 2 was used instead of the supported metallocene catalyst of Example 1.

Comparative Example 5

Polyethylene powder was obtained by the same method as Example 7, except that the supported metallocene catalyst obtained in Comparative Example 1 was used instead of the supported metallocene catalyst of Example 1, and that dimethylaluminum chloride was added in the polymerization reaction.

Specifically, 600 ml of an autoclave was vacuum dried, and then, 400 ml of hexane, 10 mg of the supported metallocene catalyst of Comparative Example 1 and dimethylaluminum chloride (5 mmol/g-$SiO_2$)/toluene solution were introduced. After raising the temperature of the reactor to 80° C., while introducing ethylene so as to maintain a pressure of 14 kgf/cm², the reaction solution was stirred and subjected to a polymerization reaction for 1 hour. After the reaction was completed, it was filtered and dried to obtain polyethylene powder.

Comparative Example A-1

Polyethylene powder was obtained by the same method as Example 7, except that the supported metallocene catalyst obtained in Comparative Example A was used instead of the supported metallocene catalyst of Example 1.

Comparative Example B-1

Polyethylene powder was obtained by the same method as Example 7, except that the supported metallocene catalyst obtained in Comparative Example B was used instead of the supported metallocene catalyst of Example 1.

Comparative Example C-1

Polyethylene powder was obtained by the same method as Example 7, except that the supported metallocene catalyst obtained in Comparative Example C was used instead of the supported metallocene catalyst of Example 1.

Experimental Example (1) Observation of Polyethylene Powder

Figure 1:
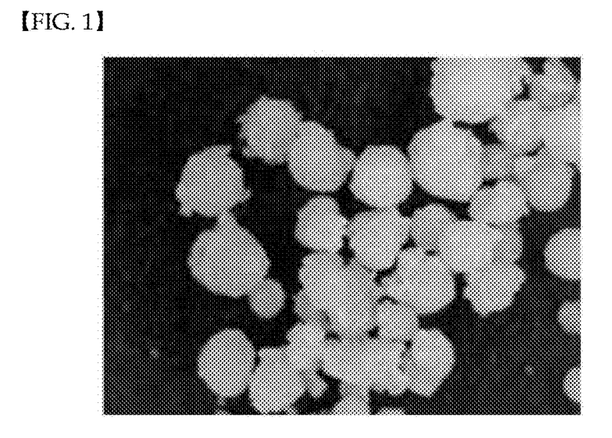
FIG. 1 is an image of the polyolefin obtained according to Example 7 of the invention taken by a camera and enlarged.
Figure 2:
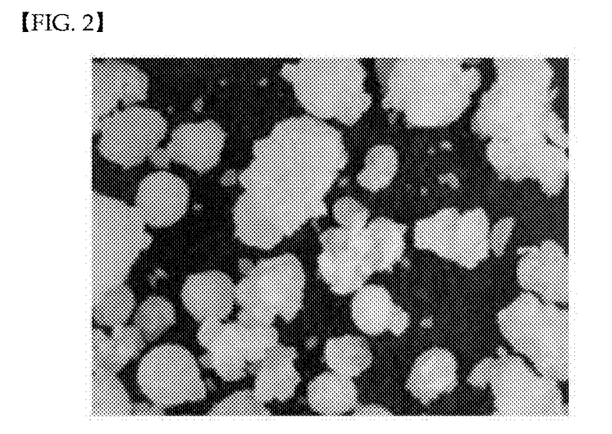
FIG. 2 is an image of the polyolefin obtained according to Comparative Example 3 taken by a camera and enlarged.

The images of polyethylene powders obtained according to Example 7 and Comparative Example 3 taken by a camera and enlarged were shown in FIG. 1 (Example 7) and FIG. 2 (Comparative Example 3).

Referring to FIG. 1, it is confirmed that the polyethylene powder obtained in Example 7 has relatively uniform particle size distribution and most of the particles have smooth shapes.

To the contrary, referring to FIG. 2, it is confirmed that the polyethylene powder obtained in Comparative Example 3 does not have uniform particle size distribution and the particle shape is not smooth. And, in the polyethylene powder obtained in Comparative Example 3, many chunks each having a particle size of 2 mm or more that are not broken by hand were included.

(2) Catalytic Activity (Kg-PE/g-$SiO_2$)

The weight of the catalyst used in the polymerization reaction and the weight of polyethylene powder obtained from the polymerization reaction were measured to calculate catalytic activity.

(3) Contents of Fine and Chunk in Polymer (Wt %)

Using a sieves (size 850 μm, 500 μm, 300 μm, 125 μm), polyethylene powders were separated according to particle size.

Specifically, using the sieves, polyethylene powders were divided into a group having a particle size of 850 μm or more; a group of 500 μm or more and less than 850 μm; a group of 300 μm or more and less than 500 μm; a group of 125 μm or more and less than 300 μm; and a group less than 125 μm. After measuring the weight of each group, the weight of each group was represented as percentage (wt %) based on the total weight of polyethylene. Among the groups, a group having a particle size less than 125 μm was classified as fine.

Additionally, among the group having a particle size of 850 μm or more, a group having a particle size greater than 2.0 mm was classified as chunk, and the weight of the chunk was represented as percentage (wt %) based on the total weight of polyethylene.

(4) Particle Size Distribution (PSD)

Using a particle size analyzer (HELOS/KF, Sympatec GmbH), particle sizes of polyethylene powders obtained in Examples and Comparative Examples were analyzed according to the standard measurement method of ISO 13320-1 (Particle size analysis-laser diffraction methods). From the analysis result, a D50 value (m) and a Span value[=(D90−D10)/D50] were obtained.

TABLE 1

| PE | Catalyst | Activity (kg-PE/g-$SiO_2$) | Chunk (wt %) | Fine (wt %) | D50 (μm) | Span |
|---|---|---|---|---|---|---|
| Example 7 | Example 1 | 6.3 | 1.32 | 0.62 | 701 | 0.82 |
| Example 8 | Example 2 | 7.2 | 1.43 | 0.92 | 769 | 0.84 |
| Example 9 | Example 3 | 6.3 | 1.61 | 1.09 | 722 | 0.88 |
| Example 10 | Example 4 | 6.4 | 1.68 | 0.68 | 742 | 0.87 |
| Example 11 | Example 5 | 6.9 | 1.59 | 1.10 | 750 | 0.90 |
| Example 12 | Example 6 | 6.6 | 1.67 | 1.21 | 745 | 0.90 |
| Comparative Example 3 | Comparative Example 1 | 7.2 | 5.50 | 2.35 | 787 | 1.12 |
| Comparative Example 4 | Comparative Example 2 | 7.1 | 5.40 | 2.41 | 770 | 1.19 |

TABLE 1-continued

| PE | Catalyst | Activity (kg-PE/ g-SiO$_2$) | Chunk (wt %) | Fine (wt %) | D50 (μm) | Span |
|---|---|---|---|---|---|---|
| Comparative Example 5 | Comparative Example 1 + DMAC* | 7.5 | 6.65 | 2.91 | 790 | 1.37 |
| Comparative Example A-1 | Comparative Example A | 6.8 | 5.75 | 2.30 | 780 | 1.07 |
| Comparative Example B-1 | Comparative Example B | 7.2 | 4.77 | 2.09 | 798 | 1.06 |
| Comparative Example C-1 | Comparative Example C | 7.0 | 4.94 | 2.21 | 774 | 1.10 |

DMAC*: dimethylaluminum chloride

Referring to Table 1, it is confirmed hat the supported metallocene catalysts according to Examples exhibit excellent polymerization activities of 6.3 kg-PE/g-SiO$_2$ or more, and simultaneously, provide polyethylene having remarkably low contents of chunk and fine and a uniform powder morphology.

Meanwhile, it is confirmed that in Comparative Example 3, polymerization activity of the supported metallocene catalyst is excellent, but the contents of chunks and fines are remarkably higher than Examples and powder morphology is inferior.

In Comparative Example 4, like Comparative Example 3, the contents of chunks and fines were high and powder morphology was inferior. Thus, it can be seen that in case the support sequence of aluminum alkyl halide and a cocatalyst compound is inversed, there is little difference from a case wherein aluminum alkyl halide is not introduced.

In Comparative Example 5, polymerization activity was slightly higher than Examples, but powder morphology was very inferior and the contents of chunks and fines were very high. Thus, it can be seen that although introduction of aluminum alkyl halide during the process of polymerization may assist in increasing polymerization activity, it has a bad influence on powder morphology.

In Comparative Examples A-1, B-1, and C-1, polymerization activities were slightly higher than Examples, but powder morphology was deteriorated and the contents of chunks and fines were high. Thus, it can be seen that introduction of a trialkyl aluminum compound instead of aluminum alkyl halide has a bad influence on powder morphology.

The invention claimed is:

1. A method for preparing a supported metallocene catalyst, comprising steps of:
   (i) supporting aluminum alkyl halide of the following Chemical Formula 1 in a silica-based carrier;
   (ii) supporting a cocatalyst compound in the silica-based carrier in which the aluminum alkyl halide is supported; and
   (iii) supporting a metallocene compound in the carrier in which the aluminum alkyl halide and the cocatalyst compound are supported,

[Chemical Formula 1]

in the Chemical Formula 1,
$R^{11}$, $R^{12}$, and $R^{13}$ are each independently C$_{1-5}$ alkyl or halogen, and one or two of the $R^{11}$ to $R^{13}$ are halogen.

2. The method for preparing a supported metallocene catalyst according to claim 1, wherein the aluminum alkyl halide is one or more compounds selected from the group consisting of dimethylaluminum chloride, diethylaluminum chloride, diisobutylaluminum chloride, methylaluminum dichloride, ethylaluminum dichloride, and isobutylaluminum dichloride.

3. The method for preparing a supported metallocene catalyst according to claim 1, wherein the step (i) comprises introducing the aluminum alkyl halide in an amount of 0.1 mmol to 20 mmol per unit weight (g) of the silica-based carrier and stirring.

4. The method for preparing a supported metallocene catalyst according to claim 1, wherein the silica-based carrier is one or more compounds selected from the group consisting of silica, silica-alumina, silica-titania, and silica-zirconia.

5. The method for preparing a supported metallocene catalyst according to claim 1, wherein the cocatalyst compound is a compound of the following Chemical Formula 2:

[Chemical Formula 2]

in the Chemical Formula 2,
$R^{21}$, $R^{22}$, and $R^{23}$ are each independently hydrogen, halogen, a C$_{1-20}$ hydrocarbyl group or a C$_{1-20}$ hydrocarbyl group substituted with halogen.

6. The method for preparing a supported metallocene catalyst according to claim 1, wherein the cocatalyst compound is one or more compounds selected from the group consisting of methylaluminoxane, ethylaluminoxane, n-butylaluminoxane, and isobutylaluminoxane.

7. The method for preparing a supported metallocene catalyst according to claim 1, wherein the metallocene compound is one or more compounds selected from the group consisting of a compound of the following Chemical Formula 3 and a compound of the following Chemical Formula 4:

[Chemical Formula 3]

[Chemical Formula 4]

in the Chemical Formulas 3 and 4,
$R^{31}$, $R^{32}$, $R^{41}$, and $R^{42}$ are each independently hydrogen, halogen, C$_{1-20}$ alkyl, C$_{2-20}$ alkenyl, C$_{1-20}$ alkoxy, or C$_{2-20}$ alkoxyalkyl, and $X^{31}$, $X^{32}$, $X^{41}$, and $X^{42}$ are each independently halogen or $C_{1-20}$ alkyl.

8. The method for preparing a supported metallocene catalyst according to claim 7, wherein the metallocene compound comprises a first metallocene compound of the Chemical Formula 3 and a second metallocene compound of the Chemical Formula 4, and the first metallocene compound and the second metallocene compound are sequentially supported in the silica-based carrier in which the aluminum alkyl halide and the cocatalyst compound are supported.

9. The method for preparing a supported metallocene catalyst according to claim 8, wherein the metallocene compound comprises the first metallocene compound and the second metallocene compound at a mole ratio of 1:0.3 to 1:3.5.

10. A supported metallocene catalyst comprising
a silica-based carrier; and
aluminum alkyl halide of the following Chemical Formula 1, a cocatalyst compound, and a metallocene compound supported in the silica-based carrier,
wherein the aluminum alkyl halide is supported at higher rate on the surface of the silica-based carrier than inside the pores of the silica-based carrier, and
the cocatalyst compound is supported at higher rate inside the pores of the silica-based carrier than on the surface of the silica-based carrier:

[Chemical Formula 1]

in the Chemical Formula 1,
$R^{11}$, $R^{12}$, and $R^{13}$ are each independently $C_{1-5}$ alkyl or halogen, and one or two of the $R^{11}$ to $R^{13}$ is halogen.

11. The supported metallocene catalyst according to claim 10, wherein the aluminum alkyl halide is one or more selected from the group consisting of dimethylaluminum chloride, diethylaluminum chloride, diisobutylaluminum chloride, methylaluminum dichloride, ethylaluminum dichloride, and isobutylaluminum dichloride.

12. The supported metallocene catalyst according to claim 10, wherein the cocatalyst compound is a compound of the following Chemical Formula 2:

[Chemical Formula 2]

in the Chemical Formula 2,
$R^{21}$, $R^{22}$, and $R^{23}$ are each independently hydrogen, halogen, a $C_{1-20}$ hydrocarbyl group or a $C_{1-20}$ hydrocarbyl group substituted with halogen.

13. The supported metallocene catalyst according to claim 10, wherein the metallocene compound is one or more compounds selected from the group consisting of a compound of the following Chemical Formula 3 and a compound of the following Chemical Formula 4:

[Chemical Formula 3]

[Chemical Formula 4]

in the Chemical Formulas 3 and 4,
$R^{31}$, $R^{32}$, $R^{41}$, and $R^{42}$ are each independently hydrogen, halogen, $C_{1-20}$ alkyl, $C_{2-20}$ alkenyl, $C_{1-20}$ alkoxy, or $C_{2-20}$ alkoxyalkyl, and
$X^{31}$, $X^{32}$, $X^{41}$, and $X^{42}$ are each independently halogen or $C_{1-20}$ alkyl.

14. The supported metallocene catalyst according to claim 13, wherein the metallocene compound comprises a first metallocene compound of the Chemical Formula 3 and a second metallocene compound of the Chemical Formula 4.

15. A method for preparing polyolefin comprising a step of polymerizing olefin monomers in the presence of the supported metallocene catalyst according to claim 10 to obtain polyolefin,
wherein the polyolefin comprises polyolefin fine with a particle size less than 125 μm and polyolefin chunk with a particle size greater than 2.0 mm, respectively in the content of 2 wt % or less.

* * * * *